No. 723,305. PATENTED MAR. 24, 1903.
T. B. REARDON.
BIAS CUTTER.
APPLICATION FILED OCT. 27, 1902.
NO MODEL.
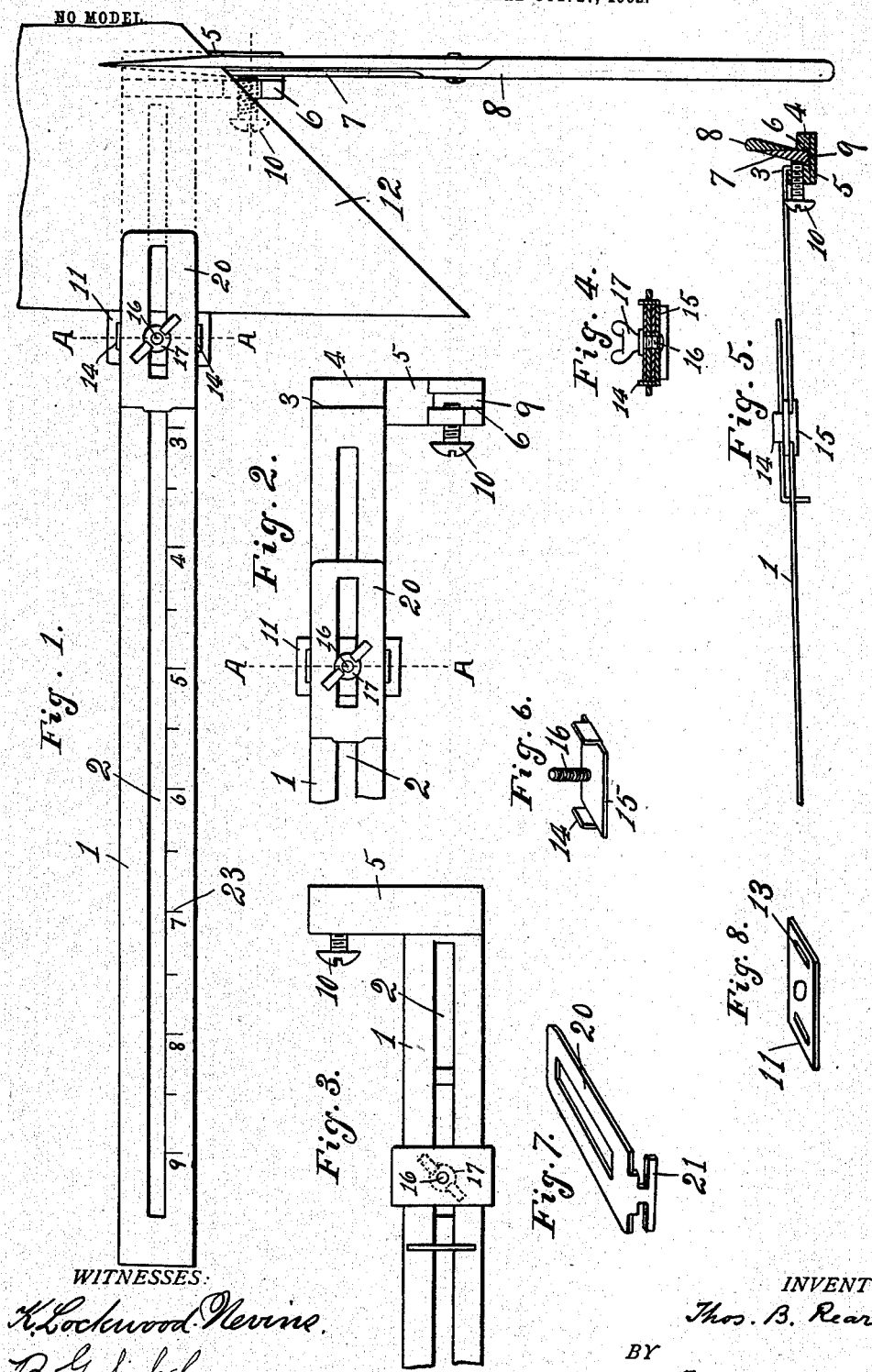
WITNESSES:
K. Lockwood Nevins.
B. Gorfinkel.
INVENTOR.
Thos. B. Reardon
BY
Francis M. Wright
ATTORNEY.

UNITED STATES PATENT OFFICE.

THOMAS B. REARDON, OF SAN JOSE, CALIFORNIA, ASSIGNOR OF ONE-HALF TO MARY A. REARDON AND KATE M. REARDON, OF SAN FRANCISCO, CALIFORNIA.

BIAS-CUTTER.

SPECIFICATION forming part of Letters Patent No. 723,305, dated March 24, 1903.

Application filed October 27, 1902. Serial No. 128,973. (No model.)

*To all whom it may concern:*

Be it known that I, THOMAS B. REARDON, a citizen of the United States, residing at San Jose, in the county of Santa Clara and State of California, have invented certain new and useful Improvements in Bias-Cutters, of which the following is a specification.

My invention relates to an improved bias-cutter, the object of my invention being to provide a device by means of which a strip of cloth of any desired width may be conveniently cut.

It is now the practice with dressmakers to cut strips of cloth for the most part on the bias. In doing this it is a matter of considerable difficulty to accurately estimate the exact width of the strip which is being cut.

It is the object of my invention to provide a device by which the strip can be cut of an accurately uniform width without special care or attention on the part of the operator, thus enabling her to do the work more expeditiously and more easily than heretofore.

My invention therefore resides in the novel construction, combination, and arrangement of parts for the above ends hereinafter fully specified, and particularly pointed out in the claims.

In the accompanying drawings, Figure 1 is a plan view of my improved device, showing the same in operation. Fig. 2 is a plan view of an end of the device, the cloth being removed. Fig. 3 is a similar view showing the under side. Fig. 4 is a cross-section on the line A A of Fig. 2. Fig. 5 is a cross-section through the clamping-screw, showing the shears held in the clamp by said screw. Figs. 6, 7, 8 are details of the parts.

Referring to the drawings, 1 represents a strip of sheet metal formed with a central longitudinal slot 2 almost its entire length. At one end said strip is bent down, as shown at 3, and then out again at right angles, as shown at 4, to form a support for the lower blade of the shears. A strip 5 is secured to said lower portion and extends laterally therefrom, and upon said strip is soldered or otherwise secured the clamp 6 for the lower blade 7 of the shears 8. Said clamp is formed with a groove 9 to receive said lower blade and on one side has a bearing for a screw 10, which screw being screwed inward presses with its point against the beveled side of said lower blade and securely holds it in position.

Upon the strip 1 slides a gage-piece 11, which forms a gage for the free end of the piece of cloth (shown at 12) from which a strip is to be cut. The ends of said gage are slotted, as shown at 13, to receive the upturned ends 14 of a plate 15. In said plate is secured a screw 16, which passes through a hole in the gage and on the upper end of which is carried a thumb-nut 17. Between said nut 17 and the gage is secured a presser-plate 20, the outer end of which is passed through the slot and is enlarged, as shown at 21, to form a guide for said presser-plate on the under side of the strip 1. Upon the near side of the slotted strip are marked figures, as shown at 23, to set the gage to indicate the width of the strip which is being cut.

In operation the cloth is passed between the strip and the presser-plate until its free edge rests against the edge of the gage. The cloth then being held by the hand, the cut is made by the shears in a direction parallel to the free edge of the cloth, and as the cut is made the shears and gage are moved forward together, the edge of the gage-plate being kept in contact with the free edge of the cloth.

I claim—

1. A gage for shears comprising a strip extending transversely to the blade of said shears and having adjustably secured thereon a gaging device arranged to contact with the free end of the cloth as the shears advance in cutting, the end of said strip being bent down at right angles and then out again in a plane parallel with the main portion of the strip, an extension carried by its free end at right angles to said strip, and a clamp 6 carried by the extension, said clamp being formed with a groove to receive the lower blade of the shears and having on one side a bearing for a screw the point of which presses against the beveled side of the lower blade and clamps it in position, said groove being in a line to pass over the outwardly-bent portion of the strip at right angles to said strip whereby the blade of the shears can be secured in the groove so as to extend over said outwardly-bent portion beyond or in front of said strip, substantially as described.

2. In combination, a slotted strip, means carried thereby for securing a blade of a pair of shears transversely to said strip, a gage-plate slidable on said strip, a slotted presser-plate above said gage-plate slidable independently both of the gage-plate and strip, a screw passing through said slots and gage-plate, and a clamping-nut, substantially as described.

3. In combination, a slotted strip, means carried thereby for securing a blade of a pair of shears transversely to said strip, a plate whose ends are contracted and bent upwardly, a gage-plate having slotted ends receiving said contracted ends of the first plate, the strip lying between the two plates, a presser-plate having its outer end passed through the slot of the strip and enlarged to form a guide for said presser-plate, said presser-plate lying between the contracted ends of the first plate, and being also slotted and the first plate and gage-plate being apertured, and a clamping-screw through said apertures and slots and securing the parts together, substantially as described.

In witness whereof I have hereunto set my hand in the presence of two subscribing witnesses.

THOS. B. REARDON.

Witnesses:
FRANCIS M. WRIGHT,
BESSIE GORFINKEL.